UNITED STATES PATENT OFFICE.

CARL IMMERHEISER, OF LUDWIGSHAFEN-ON-THE-RHINE, AND ANTON BEYER, OF MANNHEIM, GERMANY, ASSIGNORS TO BADISCHE ANILIN & SODA FABRIK, OF LUDWIGSHAFEN-ON-THE-RHINE, GERMANY, A CORPORATION.

COLOR-LAKE AND PRODUCING SAME.

1,232,552.

Specification of Letters Patent. Patented July 10, 1917.

No Drawing. Application filed August 3, 1914. Serial No. 854,732.

*To all whom it may concern:*

Be it known that we, CARL IMMERHEISER and ANTON BEYER, citizens of the German Empire, residing at Ludwigshafen-on-the-Rhine and Mannheim respectively, Germany, have invented new and useful Improvements in Color-Lakes and Producing Same, of which the following is a specification.

We have discovered that coloring matter lakes which possess a great brilliancy, are extremely fast to water and very fast against the action of light, can be obtained by precipitating basic coal tar coloring matters by means of a complex acid containing tungsten, for instance, phosphotungstic acid and silicotungstic acid, and as instances of phosphotungstic acids which can be used according to our invention, we mention phospho-duodeci-tungstic acid and the phospho-luteo-tungstic acid described in the *Zeitschrift für Anorganische Chemie*, vol. 1, page 431. For the purposes of this invention, we regard salts of the said complex acids as equivalent to the acids themselves.

The following example will serve to illustrate further the nature of this invention, which, however, is not confined to this example. The parts are by weight.

*Example.*

Mix one hundred parts of a ten per cent. paste containing aluminium hydrate and barium sulfate (obtainable by mixing together aqueous solutions of ten parts of aluminium sulfate containing 18% $Al_2O_3$, five parts of calcined sodium carbonate and twelve parts of barium chlorid) with a solution of one part of crystal violet (a salt of hexamethyl-triamino-triphenylcarbinol) in one hundred parts of water and then add an aqueous solution of from two to three parts of acid sodium phospho-duodeci-tungstate until the coloring matter is completely precipitated. The pure violet lake is then filtered off and can be worked up in the usual manner.

The precipitation can take place at the ordinary temperature, or at a raised temperature, and either with or without the addition of Turkey red oil, sodium acetate, or other suitable addition or additions. The precipitation can, for instance, be carried out in the presence of any suitable substratum, and the concentration of the various ingredients can be varied within wide limits.

Instead of crystal violet other basic coal tar coloring matters can be used, such as other violets of cognate nature, the dyestuffs of the rhodamin, auramin, malachite green series, or the dyestuff which can be obtained by condensing benzaldehyde-o-sulfonic acid with diethyl-anilin and sulfonating the condensation product and dyestuffs of similar kind, and so on. and in lieu of the sodium phospho-duodeci-tungstate other complex acids of tungsten or salts thereof are equally suitable for the purpose of the invention. All of the compositions belonging to the classes defined above are operative so far as the inventors are aware.

Now what we claim is:—

1. A coloring matter lake containing the combination of the color base of a basic coal tar coloring matter with a complex acid containing tungsten.
2. A coloring matter lake containing the combination of the color base of a basic coal tar coloring matter with a phosphotungstic acid.
3. A coloring matter lake containing the combination of the color base of a basic coal tar coloring matter with phospho-duodeci-tungstic acid.
4. A coloring matter lake containing the combination of hexamethyltriamino-triphenylcarbinol with phospho-duodeci-tungstic acid.
5. The process of producing coloring matter lakes by precipitating a basic coal tar coloring matter by means of a complex acid containing tungsten.
6. The process of producing coloring matter lakes by precipitating a basic coal tar coloring matter by means of a phosphotungstic acid.
7. The process of producing coloring matter lakes by precipitating a basic coal tar coloring matter by means of phospho-duodeci-tungstic acid.

8. The process of producing a coloring matter lake by precipicating of hexamethyl-triamino-triphenylcarbinol with acid sodium-phospho-duodeci-tungstate.

In testimony whereof we have hereunto set our hands in the presence of two subscribing witnesses.

CARL IMMERHEISER.
ANTON BEYER.

Witnesses:
J. ALEC LLOYD,
AUSTEN HERR.